(12) United States Patent
Yang et al.

(10) Patent No.: US 10,237,214 B2
(45) Date of Patent: Mar. 19, 2019

(54) METHODS AND DEVICES FOR SHARING MEDIA DATA BETWEEN TERMINALS

(71) Applicant: Beijing Xiaomi Mobile Software Co., Ltd., Haidian District, Beijing (CN)

(72) Inventors: Dongdong Yang, Beijing (CN); Linghua Gu, Beijing (CN); Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 111 days.

(21) Appl. No.: 15/402,817

(22) Filed: Jan. 10, 2017

(65) Prior Publication Data
US 2017/0289740 A1    Oct. 5, 2017

(30) Foreign Application Priority Data
Mar. 29, 2016   (CN) .......................... 2016 1 0187541

(51) Int. Cl.
*G06F 15/16* (2006.01)
*H04L 12/58* (2006.01)
(Continued)

(52) U.S. Cl.
CPC ............ *H04L 51/04* (2013.01); *H04B 5/0031* (2013.01); *H04W 4/80* (2018.02); *H04L 61/2007* (2013.01);
(Continued)

(58) Field of Classification Search
CPC ....... H04W 4/008; H04W 4/80; H04W 84/12; H04W 88/02; H04B 5/0031; H04L 51/04; H04L 61/2007; H04L 61/6022
(Continued)

(56) References Cited

U.S. PATENT DOCUMENTS 8,676,273 B1 *   3/2014  Fujisaki ............. H04M 1/6505
                                                           455/567
9,860,314 B2 *   1/2018  Kore ....................... H04L 67/28
(Continued)

FOREIGN PATENT DOCUMENTS

CN      103491183 A     1/2014
CN      104902309 A     9/2015
(Continued)

OTHER PUBLICATIONS

International Search Report issued in corresponding International Application No. PCT/CN2016/100491, dated Dec. 15, 2016, 4 pages.
(Continued)

*Primary Examiner* — Sm A Rahman
(74) *Attorney, Agent, or Firm* — Arch & Lake LLP

(57) ABSTRACT

Methods and devices are provided for sharing media data between terminals. The method includes: a first terminal receives a media data sharing parameter through a NFC link, the media data sharing parameter including: a sharing link connection parameter, and/or, location information of media data to be shared. When the media data sharing parameter includes the sharing link connection parameter, the first terminal establishes a sharing link between the first terminal and the second terminal according to the sharing link connection parameter, and acquires the media data to be shared through the sharing link. When the media data sharing parameter includes the location information of the media data to be shared, the first terminal acquires the media data to be shared according to the location information of the media data to be shared.

13 Claims, 3 Drawing Sheets

(51) Int. Cl.
H04B 5/00 (2006.01)
H04W 4/80 (2018.01)
*H04L 29/12* (2006.01)
*H04W 84/12* (2009.01)
*H04W 88/02* (2009.01)

(52) U.S. Cl.
CPC ......... *H04L 61/6022* (2013.01); *H04W 84/12* (2013.01); *H04W 88/02* (2013.01)

(58) Field of Classification Search
USPC .......................................................... 709/204
See application file for complete search history.

(56) References Cited

U.S. PATENT DOCUMENTS

2014/0065960 A1   3/2014  Gang et al.
2014/0127994 A1   5/2014  Nightingale et al.

FOREIGN PATENT DOCUMENTS

| CN | 104967887 A | 10/2015 |
| CN | 105430594 A | 3/2016 |
| CN | 105704655 A | 6/2016 |
| WO | 2012119389 A1 | 9/2012 |

OTHER PUBLICATIONS

Written Opinion of the International Search Authority issued in corresponding International Application No. PCT/CN2016/100491, dated Dec. 15, 2016, 5 pages.

Extended European Search Report issued in corresponding EP Application No. 16198920, dated Jun. 23, 2017, 8 pages.

Chinese First Office Action (including English translation) issued in corresponding CN Patent Application No. 201610187541.9, dated Jun. 29, 2018, 23 pages.

\* cited by examiner

METHODS AND DEVICES FOR SHARING MEDIA DATA BETWEEN TERMINALS

CROSS-REFERENCE TO RELATED APPLICATIONS

This application is filed based upon and claims priority to Chinese Patent Application No. 201610187541.9, filed on Mar. 29, 2016, the entire contents of which are incorporated herein by reference.

TECHNICAL FIELD

The present disclosure generally relates to media data sharing, and more particularly, to methods and devices for sharing media data between terminals.

BACKGROUND

Along with popularization of smart terminals such as smart phones and tablet computers, users and friends may view media resources such as news, stories, social information, and videos on these smart terminals.

In a related technology, when a user is intended to share media resources with friends, he/she may share these media resources through BlueTooth (BT), accessing the same local area network, or the like. For example, when the resources are shared through BT, the user is required to be paired and connected with the friends for data transmission through BT accounts; and when data is transmitted through the local area network, the user and the friends are all required to access the same local area network by using accounts, passwords and the like, and then perform data transmission after accessing.

SUMMARY

According to a first aspect of the present disclosure, a method for sharing media data between terminals is provided. In the method, a first terminal receives a media data sharing parameter through a Near Field Communication (NFC) link, the media data sharing parameter including at least one of: a sharing link connection parameter and location information of media data to be shared. When the media data sharing parameter includes the sharing link connection parameter, the first terminal establishes a sharing link between the first terminal and the second terminal according to the sharing link connection parameter, and acquires the media data to be shared through the sharing link. When the media data sharing parameter includes the location information of the media data to be shared, the first terminal acquires the media data to be shared according to the location information of the media data to be shared.

According to a second aspect of the present disclosure, there is provided a method for sharing media data between terminals. In the method, a first terminal sends a media data sharing parameter to a second terminal through a Near Field Communication (NFC) link, where the media data sharing parameter includes at least one of: a sharing link connection parameter and location information of media data to be shared, so as for the second terminal to acquire the media data to be shared according to the media data sharing parameter.

According to a third aspect of the present disclosure, there is provided a device for sharing media data between terminals. The device includes: a processor; and a memory for storing an instruction executable by the processor. The processor is configured to: receive a media data sharing parameter through an NFC link. The media data sharing parameter may include at least one of: a sharing link connection parameter, and location information of media data to be shared. When the media data sharing parameter includes the sharing link connection parameter, the processor instructs the device to establish a sharing link between the device and the second terminal according to the sharing link connection parameter and acquire the media data to be shared through the sharing link. When the media data sharing parameter includes the location information of the media data to be shared, the processor acquires the media data to be shared according to the location information of the media data to be shared.

According to a fourth aspect of the present disclosure, there is provided a device for sharing media data between terminals. The device includes: a processor; and a memory for storing instructions executable by the processor. The processor is configured to: send a media data sharing parameter to a second terminal through an NFC link, the media data sharing parameter including at least one of a sharing link connection parameter or location information of media data to be shared, for the second terminal to acquire the media data to be shared according to the media data sharing parameter.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

Figure 1:
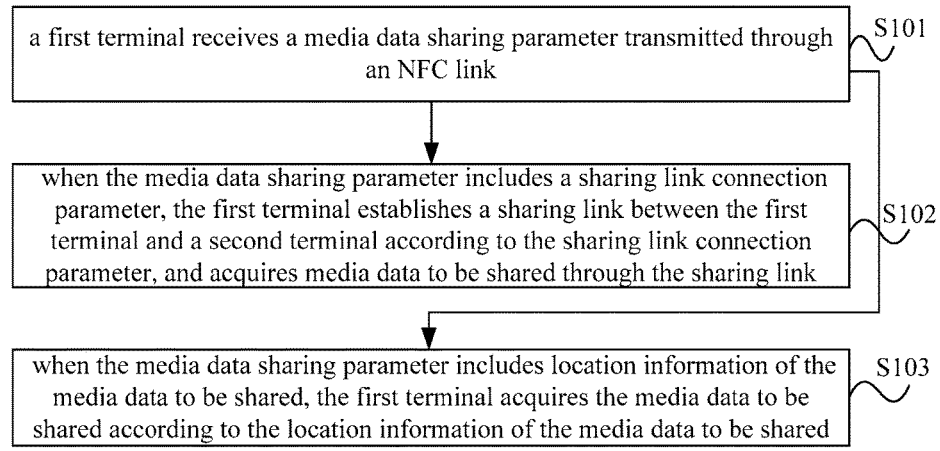
FIG. 1 is a flow chart showing a method for sharing media data between terminals, according to an exemplary embodiment.

The abovementioned accompanying drawings have shown specific embodiments of the present disclosure, and more detailed descriptions will be made hereinafter. These accompanying drawings and text descriptions are not intended to limit the scope of the concept of the present disclosure in any manner but to illustrate the concept of the present disclosure to those skilled in the art with reference to specific embodiments.

DETAILED DESCRIPTION

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the present disclosure. Instead, they are merely examples of devices and methods consistent with some aspects related to the present disclosure as recited in the appended claims.

First of all, some nouns involved in the embodiments of the present disclosure will be explained.

Near Field Communication (NFC) is a short-distance high-frequency communication technology. A terminal with the NFC function may transmit data within a short distance.

Media data refers to data such as a picture, a document and a video, which will not be limited in the embodiments of the present disclosure.

FIG. 1 is a flow chart showing a method for sharing media data between terminals, according to an exemplary embodiment. The terminals in the embodiments of the present disclosure refer to terminals with the NFC function such as mobile phones and tablet computers. The method may include the following steps.

Step 101: a first terminal receives a media data sharing parameter through an NFC link. The media data sharing parameter may be transmitted by a second terminal through the NFC link.

When a user with the second terminal is intended to share media data with a user with the first terminal, the second terminal is used to send the media data sharing parameter for the first terminal to acquire the media data through the media data sharing parameter. For example, the NFC link is selected to transmit the media data sharing parameter in the embodiment of the present disclosure, so that the media data sharing parameter may be rapidly transmitted to another terminal without inputting other linking information such as an account and a password.

Alternatively or additionally, the second terminal may be an electronic device in a restaurant or other venues for distributing information to other terminals. The first terminal may establish the NFC link by touching the second terminal and then receive promotional information, coupons, menus, maps, audio guidance, or any other information from the second terminal.

There may be multiple types of media data sharing parameters transmitted through the NFC link, and Additionally or alternatively, the media data sharing parameter includes: a sharing link connection parameter and/or location information of media data to be shared.

If the sharing link connection parameter is included, Step 102 is executed; if the location information of the media data to be shared is included, Step 103 is executed; and if both the sharing link connection parameter and the location information of the media data to be shared are included, the second terminal or the user with the second terminal may freely select to execute Step 102 or 103, which will not be limited herein.

Step 102: when the media data sharing parameter includes the sharing link connection parameter, the first terminal establishes a sharing link between the first terminal and a second terminal according to the sharing link connection parameter, and acquires the media data to be shared through the sharing link.

Here, the sharing link connection parameter may include information related to a third terminal or other devices so that the first terminal may use the sharing link connection parameter to connect to the third terminal or other devices if desired. For example, the sharing link connection parameter may include information of a smart hub, the user may touch the first terminal with a second terminal such as smart plugs or other smart appliances so that the smart plugs and smart appliances may connect to the smart hub using the sharing link connection parameter from the first terminal.

After receiving the sharing link connection parameter, the first terminal may directly establish the sharing link according to the sharing link connection parameter.

Step 103: when the media data sharing parameter includes the location information of the media data to be shared, the first terminal acquires the media data to be shared according to the location information of the media data to be shared.

The location information of the media data to be shared may be information such as a Media Access Control (MAC) address and Internet Protocol (IP) address of the media data to be shared, which will not be limited herein. The first terminal may directly perform browsing, downloading or the like according to the location information of the media data to be shared.

According to the method for sharing the media data between the terminals provided by the embodiment, the first terminal receives the media data sharing parameter through the NFC link. The first terminal establishes the sharing link between the first terminal and the second terminal according to the sharing link connection parameter and acquires the media data to be shared through the sharing link when the media data sharing parameter includes the sharing link connection parameter. Further, the first terminal may acquire the media data to be shared according to the location information of the media data to be shared when the media data sharing parameter includes the location information of the media data to be shared. As the media data sharing parameter may be rapidly transmitted within a short distance between the terminals through the NFC link, and thus the terminals may further rapidly acquire the media data to be shared according to the media data sharing parameter, efficiency of media data sharing between the terminals is improved, and user experiences are also improved.

In one or more embodiments, before the first terminal receives the media data sharing parameter transmitted by the second terminal through the NFC link, the first terminal may further establish the NFC link with the second terminal by contact impact. For example, the NFC link is established for data transmission when two terminal devices touches each other during an impact process. When a distance between the terminals is prolonged, data transmission may be stopped. That is, the NFC link is established after impact/touch of the terminals, and the sharing link connection parameter is transmitted in a continuous contact process, so that the sharing link connection parameter may be rapidly transmitted. Therefore, a terminal of a user may finish the sharing link connection parameter transmission just by quickly impacting with each terminal with a sharing requirement.

It is to be noted that some small media data may also be directly transmitted through the NFC link, for example, a small picture, which may be directly transmitted to the second terminal during impact. Here, the term "small" may be understood as having a size of the media data which is smaller than a preset threshold value.

Additionally or alternatively, the sharing link connection parameter includes: a BT connection parameter or a Wireless-Fidelity (WI-FI) connection parameter.

In the condition that the media data to be shared is directly transmitted between the first terminal and the second terminal through the link, a BT link or a WI-FI link may be adopted.

The BT connection parameter may be a BT pairing password, a BT identifier of the terminal and the like. After receiving the BT connection parameter, the first terminal may directly establish a BT connection with the second terminal without searching for a BT equipment within a certain range and then input a password and the like for connection after the BT equipment is found as in the related art, so that connection efficiency is greatly improved. After the BT connection is established, the first terminal and the second terminal may mutually send and receive the media data to be shared through the BT link.

The WI-FI connection parameter may include an account and password of a WI-FI. After receiving the WI-FI connection parameter, the first terminal may directly access the corresponding WI-FI without entering the account and the password as in the related art. Then, the first terminal and the second terminal may share the media data after accessing the same WI-FI. For example, a restaurant may provide an electronic device including NFC circuitry so that a guest may receive the WI-FI connection parameters by touching his/her smart terminal with the electronic device. Similarly, a public electronic device may be provided in many locations to provide restaurant menus, trail maps, shopping coupons, or any other information when the user touches the smart terminal with the public electronic devices.

Additionally or alternatively, the location information of the media data to be shared includes: storage address information of the media data to be shared.

When intended to share the media data to the first terminal, the second terminal may upload and store the media data to be shared to a location such as a cloud server, and then notifies the first terminal of the storage address information, such as the MAC address or the IP address, which is not limited herein, of the media data to be shared through the media data sharing parameter. After receiving the media data sharing parameter, the first terminal may find the media data to be shared according to the storage address information, and then directly performs browsing, downloading or the like according to a specific condition.

Based on the embodiment, the media data may also be synchronously played among multiple terminals.

Additionally or alternatively, the first terminal may further receive a synchronization parameter of the media data to be shared transmitted by the second terminal through the NFC link. The synchronization parameter includes: playing progress information of the media data to be shared. That is, the first terminal has viewed a part of the media data to be shared, and a progress of the media data to be shared which has been played on the first terminal may be indicated through the synchronization parameter. For example, if the media data to be shared is a certain document such as news and social information, the playing progress information of the media data to be shared may be progress information such as a currently browsed page and row of the document. If the media data to be shared is a certain video, the playing progress information of the media data to be shared may be a playing time node of the video. Settings may be made according to a specific condition, and will not be limited herein.

After acquiring the media data to be shared, the first terminal may directly play the media data to be shared synchronously with the second terminal according to the synchronization parameter.

Figure 2:
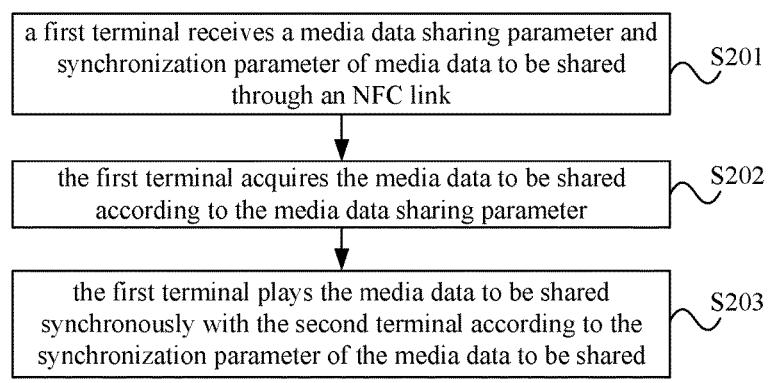
FIG. 2 is a flow chart showing a method for sharing media data between terminals, according to another exemplary embodiment.

FIG. 2 is a flow chart showing a method for sharing media data between terminals, according to another exemplary embodiment. A media data sharing parameter and a synchronization parameter may be transmitted at the same time after a first terminal and a second terminal establish an NFC link initiated by an impact between the first and second terminals. After the transmission is completed, the first terminal may directly acquire and play media data to be shared synchronously with the second terminal. The method may include the following steps.

Step 201: the first terminal receives the media data sharing parameter and synchronization parameter of the media data to be shared transmitted by the second terminal through the NFC link.

Step 202: the first terminal acquires the media data to be shared according to the media data sharing parameter.

For example, the media data to be shared may be acquired by a method in the abovementioned embodiment, for example, by establishing a BT link or a WI-FI link, or downloading from a cloud server, which is not limited herein.

Step 203: the first terminal plays the media data to be shared synchronously with the second terminal according to the synchronization parameter of the media data to be shared.

By adopting the method provided by the embodiments of the present disclosure, media data sharing efficiency is greatly improved, and synchronous playing of the media data among multiple terminals may also be rapidly implemented.

The first terminal may be a receiving party of NFC link transmission, and may also be an initiating party of NFC transmission. In another exemplary embodiment of the present disclosure, correspondingly to the abovementioned method embodiment, the first terminal sends a media data sharing parameter to the second terminal through the NFC link. The media data sharing parameter includes: a sharing link connection parameter and/or location information of the media data to be shared.

Furthermore, the second terminal receives the media data sharing parameter sent by the first terminal through the NFC link, and acquires the media data to be shared according to the media data sharing parameter. With reference to the abovementioned embodiment, the second terminal may establish a BT link or a WI-FI link with the first terminal, and then the first terminal may directly send the media data to be shared to the second terminal; or the media data to be shared may be downloaded from the cloud server, which is not limited herein.

According to the method for sharing the media data between the terminals provided by the embodiment, the first terminal sends the media data sharing parameter to the second terminal through the NFC link. As the media data sharing parameter may be rapidly transmitted within a short distance between the terminals through the NFC link, and thus the terminals may rapidly acquire the media data to be shared according to the media data sharing parameter, efficiency of media data sharing between the terminals is improved, and user experiences are also improved.

If the first terminal is intended to share the media data to the second terminal by establishing a sharing link, it is only required to send the sharing link connection parameter, establish the sharing link with the second terminal and directly send the media data to be shared. Such a manner is applicable to media data occupying a small space, which, however, will not be limited herein.

Additionally or alternatively, the sharing link connection parameter may be a BT connection parameter or a WI-FI connection parameter, which may refer to the abovementioned embodiment and will not be elaborated herein.

If the first terminal is intended to share the media data through the cloud server, the media data to be shared may be uploaded to the cloud server at first, and then location information of the media data to be shared stored in the cloud server is sent to the second terminal through the media data sharing parameter. That is, the first terminal stores the media data to be shared in a storage space corresponding to the location information of the media data to be shared.

Additionally or alternatively, the location information of the media data to be shared includes storage address information of the media data to be shared, which may refer to the abovementioned embodiment and will not be elaborated herein.

Of course, the first terminal may also send both the sharing link connection parameter and the location information of the media data to be shared at the same time for the receiving party, i.e. the second terminal, to select, which will not be limited herein.

Additionally or alternatively, the first terminal may send the synchronization parameter of the media data to be shared to the second terminal through the NFC link, and the synchronization parameter includes: playing progress information of the media data to be shared. Then, the second terminal may play the media data to be shared synchronously with the first terminal according to the playing progress information of the media data to be shared. This may refer to the abovementioned embodiment, and will not be elaborated herein.

A device embodiment of the present disclosure as described below may be applied to execute the method embodiment of the present disclosure. For details undisclosed in the device embodiment of the present disclosure, the method embodiment of the present disclosure may be referred to.

Figure 3:
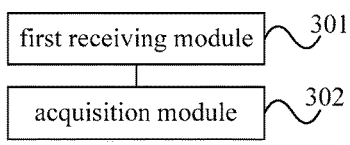
FIG. 3 is a block diagram of a device for sharing media data between terminals, according to an exemplary embodiment.

FIG. 3 is a block diagram of a device for sharing media data between terminals, according to an exemplary embodiment. The device may be implemented as part or entire of an electronic equipment including a touch display screen by virtue of software, hardware or a combination of the two. The device may include: a first receiving module 301 and an acquisition module 302. The first receiving module 301 is configured to receive a media data sharing parameter through an NFC link, the media data sharing parameter including: a sharing link connection parameter and/or location information of media data to be shared. Here, the media data sharing parameter may be transmitted by a second terminal through the NFC link.

The acquisition module 302 is configured to, when the media data sharing parameter includes the sharing link connection parameter, establish a sharing link between the device and the second terminal according to the sharing link connection parameter and acquire the media data to be shared through the sharing link, or when the media data sharing parameter includes the location information of the media data to be shared, acquire the media data to be shared according to the location information of the media data to be shared.

From the above, according to the device for sharing the media data between the terminals provided by the embodiment, the media data sharing parameter may be rapidly transmitted within a short distance between the terminals through the NFC link, and thus the terminals may rapidly acquire the media data to be shared according to the media data sharing parameter, so that efficiency of media data sharing between the terminals is improved, and user experiences are also improved.

Figure 4:
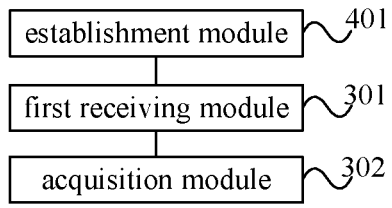
FIG. 4 is a first block diagram of a device for sharing media data between terminals based on FIG. 3.

FIG. 4 is a first block diagram of a device for sharing media data between terminals based on FIG. 3. Based on FIG. 3, the device may further include: an establishment module 401, configured to establish the NFC link with the second terminal by contact impact.

Figure 5:
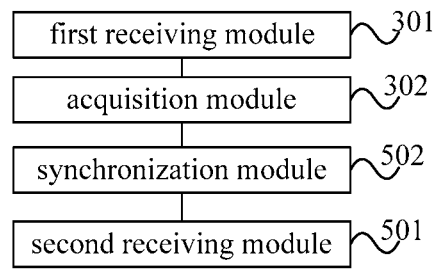
FIG. 5 is a second block diagram of a device for sharing media data between terminals based on FIG. 3.

FIG. 5 is a second block diagram of a device for sharing media data between terminals based on FIG. 3. Based on FIG. 3, the device may further include: a second receiving module 501 and a synchronization module 502.

The second receiving module 501 is configured to receive a synchronization parameter of the media data to be shared transmitted by the second terminal through the NFC link, the synchronization parameter including: playing progress information of the media data to be shared.

The synchronization module 502 is configured to, after the acquisition module acquires the media data to be shared, play the media data to be shared synchronously with the second terminal according to the synchronization parameter.

Additionally or alternatively, the sharing link connection parameter includes: a BT connection parameter or a WI-FI connection parameter.

Additionally or alternatively, the location information of the media data to be shared includes: storage address information of the media data to be shared.

Figure 6:
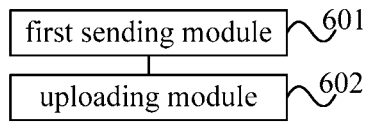
FIG. 6 is a block diagram of a device for sharing media data between terminals, according to another exemplary embodiment.

FIG. 6 is a block diagram of a device for sharing media data between terminals, according to another exemplary embodiment. The device may be implemented as part or entire of an electronic equipment including a touch display screen by virtue of software, hardware or a combination of the two. The device may include: a first sending module 601, configured to send a media data sharing parameter to a second terminal through an NFC link, the media data sharing parameter including: a sharing link connection parameter, and/or, location information of media data to be shared, for the second terminal to acquire the media data to be shared according to the media data sharing parameter.

According to the device for sharing the media data between the terminals provided by the embodiment, the media data sharing parameter is sent to the second terminal through the NFC link. As the media data sharing parameter may be rapidly transmitted within a short distance between the terminals through the NFC link, and the terminals may rapidly acquire the media data to be shared according to the media data sharing parameter, efficiency of media data sharing between the terminals is improved, and user experiences are also improved.

Referring to FIG. 6, the device may further include: an uploading module 602, configured to store the media data to be shared in a storage space corresponding to the location information of the media data to be shared when the media data sharing parameter includes the location information of the media data to be shared.

Figure 7:
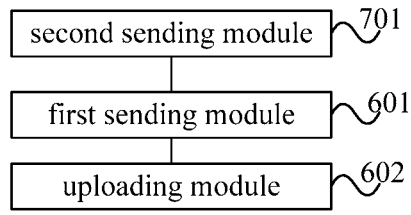
FIG. 7 is a block diagram of a device for sharing media data between terminals based on FIG. 6.

FIG. 7 is a block diagram of a device for sharing media data between terminals based on FIG. 6. Based on FIG. 6, the device may further include: a second sending module 701, configured to send a synchronization parameter of the media data to be shared to the second terminal through the NFC link, the synchronization parameter including: playing progress information of the media data to be shared.

Additionally or alternatively, the sharing link connection parameter includes: a BT connection parameter or a WI-FI connection parameter.

Additionally or alternatively, the location information of the media data to be shared includes: storage address information of the media data to be shared.

Figure 8:
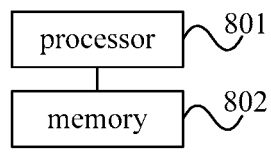
FIG. 8 is a block diagram of a device for sharing media data between terminals, according to another exemplary embodiment.

FIG. 8 is a block diagram of a device for sharing media data between terminals, according to another exemplary embodiment. The device may be implemented as part or entire of electronic equipment including a touch display screen by virtue of software, hardware or a combination of the two. The device may include: a processor 801 and a memory 802 configured to store an instruction executable by the processor.

The processor 801 is configured to: receive a media data sharing parameter transmitted by a second terminal through an NFC link, the media data sharing parameter including: a sharing link connection parameter and/or location information of media data to be shared. When the media data sharing parameter includes the sharing link connection parameter, the processor 801 instructs the device to establish a sharing link between the first terminal and the second terminal according to the sharing link connection parameter and acquire the media data to be shared through the sharing link. When the media data sharing parameter includes the location information of the media data to be shared, the processor 801 instructs the device to acquire the media data to be shared according to the location information of the media data to be shared.

Figure 9:
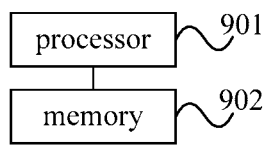
FIG. 9 is a block diagram of a device for sharing media data between terminals, according to another exemplary embodiment.

FIG. 9 is a block diagram of a device for sharing media data between terminals, according to another exemplary embodiment. The device may be implemented as part or entire of an electronic equipment including a touch display screen by virtue of software, hardware or a combination of the two. The device may include: a processor 901 and a memory 902 configured to store an instruction executable by the processor.

The processor 901 is configured to: send a media data sharing parameter to a second terminal through an NFC link, the media data sharing parameter including: a sharing link connection parameter and/or location information of media data to be shared, for the second terminal to acquire the media data to be shared according to the media data sharing parameter.

With respect to the devices in the above embodiments, the specific manners for performing operations for individual modules therein have been described in detail in the embodiments regarding the methods, which will not be elaborated herein.

Figure 10:
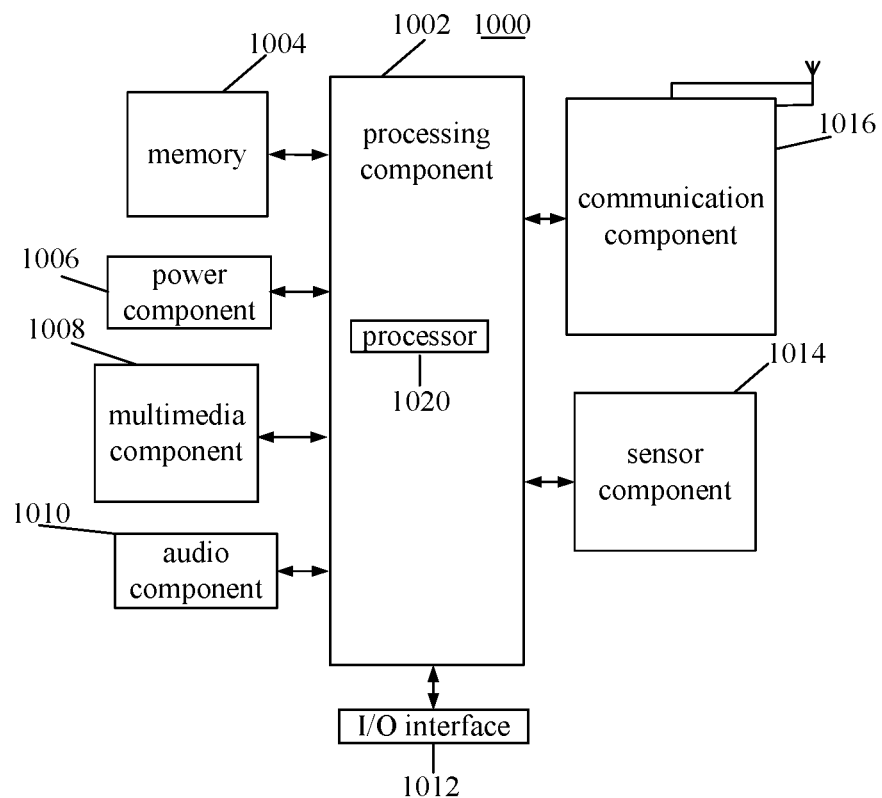
FIG. 10 is a block diagram of a device 1000 for sharing media data between terminals, according to an exemplary embodiment.

FIG. 10 is a block diagram of a device 1000 for sharing media data between terminals, according to an exemplary embodiment. For example, the device 1000 may be a terminal with an NFC function such as a mobile phone and a tablet computer.

Referring to FIG. 10, the device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the steps in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

The memory 1004 is configured to store various types of data to support the operation of the device 1000. Examples of such data include instructions for any application programs or methods operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1006 provides power for various components of the device 1000. The power component 1006 may include a power management system, one or more power supplies, and other components associated with the generation, management and distribution of power for the device 1000.

The multimedia component 1008 includes a touch screen providing an output interface between the device 1000 and a user. In some embodiments, the touch screen may include a Liquid Crystal Display (LCD) and a Touch Panel (TP). The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capabilities.

The audio component 1010 is configured to output and/or input an audio signal. For example, the audio component 1010 includes a Microphone (MIC), which is configured to receive an external audio signal when the device 1000 is in the operation mode, such as a call mode, a recording mode and a voice recognition mode. The received audio signal may be further stored in the memory 1004 or sent by the communication component 1016. In some embodiments, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a location of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a optical sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a WI-FI network, a 2nd-Generation (2G) or 3rd-Generation (3G) network or a combination thereof. In an exemplary embodiment, the communication component 1016 receives a broadcast signal or broadcast associated information from an external broadcast management system through a broadcast channel. In an exemplary embodiment, the communication component 1016 further includes an NFC module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and other technologies.

In an exemplary embodiment, the device 1000 may be implemented by one or more circuitries, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device may use the circuitries in combination with the other hardware or software components for performing the above described methods. Each module, sub-module, unit, or sub-unit in the disclosure may be implemented at least partially using the one or more circuitries.

In an exemplary embodiment, there is also provided a non-transitory computer-readable storage medium including an instruction, such as the memory 1004 including an instruction, and the instruction may be executed by the processor 1020 of the device 1000 to implement the abovementioned method. For example, the non-transitory computer-readable storage medium may be a ROM, a Compact Disc Read-Only Memory (CD-ROM), a magnetic tape, a floppy disc, an optical data storage device and the like. Further, each module or sub-module may include non-transitory memory (shared, dedicated, or group) that stores code or instructions that can be executed by one or more processors. The module or sub-module may take the form of a packaged functional hardware unit designed for use with other components, a portion of a program code (e.g., software or firmware) executable by the processor 1218, one or more circuitries that usually perform a particular function of related functions, or a self-contained hardware or software component that interfaces with a larger system, for example.

According to a non-transitory computer-readable storage medium, when an instruction in the storage medium is executed by the processor of the device 1000, the device 1000 may execute the abovementioned method for sharing media data between terminals.

Other embodiments of the present disclosure will be apparent to those skilled in the art from consideration of the specification and practice of the present disclosure. This application is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

According to the embodiments of the disclosure, the first terminal receives the media data sharing parameter transmitted by the second terminal through the NFC link, the first terminal establishes the sharing link between the first terminal and the second terminal according to the sharing link connection parameter and acquires the media data to be shared through the sharing link when the media data sharing parameter includes the sharing link connection parameter, and/or, the first terminal acquires the media data to be shared according to the location information of the media data to be shared when the media data sharing parameter includes the location information of the media data to be shared. As the media data sharing parameter may be rapidly transmitted within a short distance between the terminals through the NFC link, and the terminals may further rapidly acquire the media data to be shared according to the media data sharing parameter, efficiency of media data sharing between the terminals is improved, and user experiences are also improved.

What is claimed is:

1. A method for sharing media data between terminals, comprising:
   receiving, by a first terminal, a media data sharing parameter through a Near Field Communication (NFC) link, the media data sharing parameter comprising at least one of a sharing link connection parameter or location information of media data to be shared;
   when the media data sharing parameter comprises the sharing link connection parameter, establishing, by the first terminal, a sharing link between the first terminal and a second terminal according to the sharing link connection parameter wherein the sharing link connection parameter comprises information related to a third terminal and the first terminal connects to the third terminal by using the sharing link connection parameter, and acquiring the media data to be shared through the sharing link; and
   when the media data sharing parameter comprises the location information of the media data to be shared, acquiring, by the first terminal, the media data to be shared according to the location information of the media data to be shared;
   wherein the method further comprises:
   receiving, by the first terminal, a synchronization parameter of the media data to be shared transmitted by the second terminal through the NFC link, wherein the synchronization parameter comprises playing progress information of the media data to be shared, and the playing progress information comprise at least one of a currently browsed page, row or a playing time point of the media data to be shared; and
   playing, by the first terminal, the media data to be shared synchronously with the second terminal according to the playing progress information of the media data to be shared after acquiring the media data to be shared.

2. The method according to claim 1, further comprising:
   establishing, by the first terminal, the NFC link with the second terminal by contact impact before the first terminal receives the media data sharing parameter transmitted by the second terminal through the NFC link.

3. The method according to claim 1, wherein the sharing link connection parameter comprises at least one of: a BlueTooth (BT) connection parameter or a Wireless-Fidelity (WI-FI) connection parameter.

4. The method according to claim 1, wherein the location information of the media data to be shared comprises: storage address information of the media data to be shared.

5. A method for sharing media data between terminals, comprising:
   sending, by a first terminal, a media data sharing parameter to a second terminal through a Near Field Communication (NFC) link, the media data sharing parameter comprising at least one of a sharing link connection parameter or location information of media data to be shared wherein the sharing link connection parameter comprises information related to a third terminal and the first terminal connects to the third terminal by using the sharing link connection parameter, so as for the second terminal to acquire the media data to be shared according to the media data sharing parameter;
   wherein the method further comprises:
   sending, by the first terminal, a synchronization parameter of the media data to be shared to the second terminal through the NFC link, wherein the synchronization parameter comprises playing progress information of the media data to be shared, and the playing progress information comprises at least one of a currently browsed page, row or a playing time point of the media data to be shared; and
   playing, by the second terminal, the media data to be shared synchronously with the first terminal according to the playing progress information of the media data to be shared after acquiring the media data to be shared.

6. The method according to claim 5, when the media data sharing parameter comprises the location information of the media data to be shared, the method further comprising:
   storing, by the first terminal, the media data to be shared in a storage space corresponding to the location information of the media data to be shared.

7. The method according to claim 5, wherein the sharing link connection parameter comprises at least one of: a BlueTooth (BT) connection parameter or a Wireless-Fidelity (WI-FI) connection parameter.

8. The method according to claim 5, wherein the location information of the media data to be shared comprises: storage address information of the media data to be shared.

9. A device for sharing media data between terminals, comprising:
   a processor; and
   a memory for storing instructions executable by the processor;
   wherein the processor is configured to:
   receive a media data sharing parameter through a Near Field Communication (NFC) link, the media data sharing parameter comprising at least one of a sharing link connection parameter or location information of media data to be shared;
   when the media data sharing parameter comprises the sharing link connection parameter, establish a sharing link between the device and a second terminal according to the sharing link connection parameter wherein the sharing link connection parameter comprises information related to a third terminal and the first terminal connects to the third terminal by using the sharing link connection parameter and acquire the media data to be shared through the sharing link; and
   when the media data sharing parameter comprises the location information of the media data to be shared, acquire the media data to be shared according to the location information of the media data to be shared;
   wherein the processor is further configured to:
   receive a synchronization parameter of the media data to be shared transmitted by the second terminal through the NFC link, wherein the synchronization parameter comprises playing progress information of the media data to be shared, and the playing progress information comprises at least one of a currently browsed page, row or a playing time point of the media data to be shared; and
   play the media data to be shared synchronously with the second terminal according to the playing progress information of the media data to be shared after acquiring the media data to be shared.

10. The device according to claim 9, wherein the processor is further configured to:
    establish the NFC link with the second terminal by contact impact.

11. The device according to claim 9, wherein the sharing link connection parameter comprises: a BlueTooth (BT) connection parameter or a Wireless-Fidelity (WI-FI) connection parameter.

12. The device according to claim 10, wherein the location information of the media data to be shared comprises: storage address information of the media data to be shared.

13. A non-transitory computer-readable storage medium having stored therein instructions that, when executed by a processor of a first terminal, causes the first terminal to perform a method for sharing media data between terminals, the method comprising:
  receiving a media data sharing parameter through a Near Field Communication (NFC) link, the media data sharing parameter comprising at least one of a sharing link connection parameter or location information of media data to be shared;
  when the media data sharing parameter comprises the sharing link connection parameter, establishing a sharing link between the first terminal and a second terminal according to the sharing link connection parameter wherein the sharing link connection parameter comprises information related to a third terminal and the first terminal connects to the third terminal by using the sharing link connection parameter, and acquiring the media data to be shared through the sharing link; and
  when the media data sharing parameter comprises the location information of the media data to be shared, acquiring the media data to be shared according to the location information of the media data to be shared;
  wherein the method further comprises:
  receiving a synchronization parameter of the media data to be shared transmitted through the NFC link, wherein the synchronization parameter comprises playing progress information of the media data to be shared, and the playing progress information comprises at least one of a currently browsed page, row or a playing time node of the media data to be shared; and
  playing the media data to be shared synchronously according to the playing progress information of the media data to be shared after acquiring the media data to be shared.

\* \* \* \* \*